(12) United States Patent
Mann, Jr. et al.

(10) Patent No.: US 11,420,398 B2
(45) Date of Patent: Aug. 23, 2022

(54) RESONANT REACTIVE SUPPORT STRUCTURE FOR ADDITIVE MANUFACTURING PROCESS

(71) Applicant: The Boeing Company, Chicago, IL (US)

(72) Inventors: Robert L. Mann, Jr., Puyallup, WA (US); Hayden S. Osborn, Seattle, WA (US); Alexander J. Coco, Seattle, WA (US)

(73) Assignee: The Boeing Company, Chicago, IL (US)

( * ) Notice: Subject to any disclaimer, the term of this patent is extended or adjusted under 35 U.S.C. 154(b) by 303 days.

(21) Appl. No.: 16/843,101

(22) Filed: Apr. 8, 2020

(65) Prior Publication Data

US 2021/0316512 A1    Oct. 14, 2021

(51) Int. Cl.

| | |
|---|---|
| B29C 64/40 | (2017.01) |
| B29C 64/393 | (2017.01) |
| B29C 64/245 | (2017.01) |
| B29C 64/379 | (2017.01) |
| B29C 64/25 | (2017.01) |
| B33Y 30/00 | (2015.01) |
| B29C 64/227 | (2017.01) |
| B33Y 50/02 | (2015.01) |
| B33Y 10/00 | (2015.01) |

(52) U.S. Cl.
CPC ............ *B29C 64/40* (2017.08); *B29C 64/227* (2017.08); *B29C 64/245* (2017.08); *B29C 64/25* (2017.08); *B29C 64/379* (2017.08); *B29C 64/393* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | | |
|---|---|---|---|---|
| 4,566,520 | A * | 1/1986 | Shebuski | B22D 29/00 164/404 |
| 2017/0036401 | A1 * | 2/2017 | Donovan | B08B 7/028 |
| 2018/0311732 | A1 * | 11/2018 | El Naga | B22F 3/164 |

* cited by examiner

*Primary Examiner* — Matthew J Daniels
*Assistant Examiner* — Paul Spiel
(74) *Attorney, Agent, or Firm* — Quinn IP Law

(57) ABSTRACT

A system for separating support structure from a three-dimensional (3D)-printed component integrally printed with the support structure during an additive manufacturing (AM) process includes one or more transducers, indexing features configured to engage the transducer(s) and position the transducer(s) in contact with the support structure, and an electronic control unit (ECU). The ECU activates the transducer(s) which then vibrate at a predetermined resonant frequency of the support structure until the support structure fractures. A method includes engaging a transducer with an indexing feature, positioning the indexing feature with respect to the support structure such that the transducer is in contact with the support structure, and activating the transducer during a post-processing stage of the AM process, via the ECU, to cause the transducer to vibrate at the predetermined resonant frequency until the support structure fractures or breaks.

20 Claims, 3 Drawing Sheets

RESONANT REACTIVE SUPPORT STRUCTURE FOR ADDITIVE MANUFACTURING PROCESS

BACKGROUND

Additive manufacturing, a process that is also commonly referred to in the art as three-dimensional (3D) printing, enables the rapid construction of components having simple or highly complex surface geometries. Additive manufacturing (AM) processes are often used to construct sample components during rapid prototyping efforts, as well as to fabricate low-volume or out-of-production replacement parts. Additionally, the evolution of high-resolution scanning and printing equipment for use with a wide range of metal and polymer powder feedstock has enabled additive manufacturing to serve as a viable production option, with the associated cost of producing 3D-printed parts or other components comparing favorably to conventional processes such as injection molding, casting, or forging.

AM processes generally commence with the creation of a working design for a particular component, for instance using Computer-Aided Engineering (CAE) techniques. As will be appreciated by those of ordinary skill in the art, CAE typically utilizes finite element analysis (FAE) or other suitable techniques to create a working 3D-model. Modeling may be performed using off-the-shelf Computer-Aided Design (CAD) or Computer-Aided Manufacturing (CAM) software. Once a suitable model has been constructed, simulations are run on the model in order to test the modeled component's performance across a range of static and dynamic conditions under which the additive part is expected to operate.

The 3D model may be revised as needed based on simulation results. Once an acceptable simulation result has been observed, the model is uploaded to a 3D printer for construction of a physical specimen of the modeled component. The printer hardware is thereafter used to construct the specimen on top of an integrally-constructed substrate or build plate in a layer-by-layer manner, e.g., by progressively melting application-suitable powder feedstock in a particular pattern using a concentrated laser or electron beam. Unused or residual powder feedstock is then removed to reveal the fully-formed 3D-printed component, typically by vacuuming bulk powder stock from a build tank and thereafter manually brushing residual powder from the component. Such efforts are sometimes assisted by a water flush or compressed air. The component is then subjected to additional post-processing techniques such as build plate separation, thermal stress relief, and buffing, polishing, or grinding.

With respect to the build plate separation process in particular, the manner in which a typical 3D-printed component is progressively constructed on top of a build plate results in the integral connection of the component and build plate along interfacing component-build plate surfaces. In other words, the perimeter edges of the component are essentially welded to the build plate. Techniques such as band sawing or wire electronic discharge machining (EDM) are often employed to separate the constructed component from the build plate. However, such processes tend to be manually intensive, which is particularly true when the component is constructed of hardened materials or superalloys.

SUMMARY

Disclosed herein are manufacturing processes and associated hardware that together facilitate the clean separation and removal of a three-dimensional (3D) printed component during an additive manufacturing (AM) process. The present teachings may be beneficial when applied to 3D-printing using both metal and polymer powder feedstock. As described generally above, a 3D-printed component is progressively constructed layer-by layer, for example in a build tank of a powder bed fusion system using a laser beam, an electron beam, or another suitable concentrated heat source. After the component and integrally-formed build plate is thermally treated for the purpose of stress relief, e.g., using a process oven, the component is separated from the build plate and a support structure used to temporarily support the component during the printing portion of the AM process.

To this end, a targeted vibration-based solution is applied herein to the above-noted problem of efficiently and effectively separating the support structure. The present method may be used for removing types of support structure not otherwise easily removed by hand using typical approaches such as sawing or CNC milling. Similar to the results of manually-intensive sawing or breaking of the support structure, a component separated using the present vibration energy-based techniques may retain residual support rash, i.e., material of the support structure that remains adhered to the component. Support rash may be removed after separation of the support structure, for instance using chemical milling or hand polishing/abrasion, as will be appreciated by those of ordinary skill in the art.

An exemplary approach described herein includes engaging the 3D-printed component and build plate using an end-effector, e.g., a standalone device or an end link of a multi-axis industrial robot or other serial robot. One or more transducers, which are configured to vibrate at a predetermined resonant frequency of the support structure, are mechanically coupled to the support structure, for instance using a tool tab or indexing feature as set forth herein. The resonant frequency of the support structure is dependent upon the particular properties of the materials used to construct the component and the component's geometry. Modal formulation and FEA solver software such as NASTRAN may be used offline to determine the resonant frequency as a calibrated or predetermined value, with the transducers used in the present method configured beforehand to resonate at this particular frequency or frequency range.

Once connected to the support structure, the transducer(s) are selectively activated by vibration control signals transmitted by an electronic control unit (ECU). The vibration control signals cause the transducer(s) and thus the support structure to vibrate at the predetermined resonant frequency, which as set forth herein differs from a corresponding resonant frequency of the component to prevent the component itself from resonating. Vibration energy generated by the transducers is directed into the materials of the support structure, with the support structure thereafter resonating for a calibrated duration sufficient for fracturing the support structure. Once fractured, the support structure materials are free to separate from the component as detritus that is then removed and disposed of or recycled.

The ECU may be optionally programmed with multiple vibration control profiles. In such an embodiment, each of the profiles corresponds to a different predetermined configuration of the component. The ECU selectively activates the transducers using a selected one of the vibration control profiles that corresponds to the actual configuration of the component, with the actual configuration possibly as identified to or by the ECU using electronic signals.

The system in some embodiments includes a human-machine interface (HMI) device configured to transmit the electronic signals to the ECU in response to an input request, e.g., a touch screen input from an operator. The disclosed system may also include a multi-axis serial robot connected to the end-effector such that the end-effector forms a distal end link of the serial robot. The ECU may be used in such an embodiment to control gross or macro motion of the robot concurrently with selectively activating the transducers.

A method is also disclosed herein for separating the support structure. The method may include engaging a transducer with an indexing feature and positioning the indexing feature with respect to the support structure such that the transducer is in contact therewith. The method may also include selectively activating the transducer during a post-processing stage of the AM process, via the ECU, to thereby cause the transducer to vibrate at the predetermined resonant frequency until the support structure fractures or breaks. Additionally, the method includes separating the support structure from the 3D-printed component after the support structure fractures or breaks.

Another embodiment of the present system includes a multi-axis serial robot, an end-effector having a base with a through-opening configured to receive the build plate, a plurality of transducers, a plurality of indexing features, and an ECU. The indexing features are each configured to engage a corresponding one of the transducers, to engage the build plate, and to position the corresponding one of the transducers in contact with the support structure. The ECU in this particular embodiment is in communication with the transducers and configured to selectively activate the transducers during a post-processing stage of the AM process to thereby cause the transducers to vibrate at the predetermined resonant frequency of the support structure. This transpires until the support structure fractures or breaks, thereby separating the support structure from the 3D-printed component.

The above summary is not intended to represent every embodiment or every aspect of the present disclosure. Rather, the foregoing summary merely provides an illustration or exemplification of some of the novel concepts and features set forth herein. The above-noted and other features and advantages will be readily apparent from the following detailed description of illustrated embodiments and representative modes for carrying out the disclosure when taken in connection with the accompanying drawings and appended claims. Moreover, the present disclosure expressly includes combinations and sub-combinations of the various elements and features presented herein.

Figure 1:
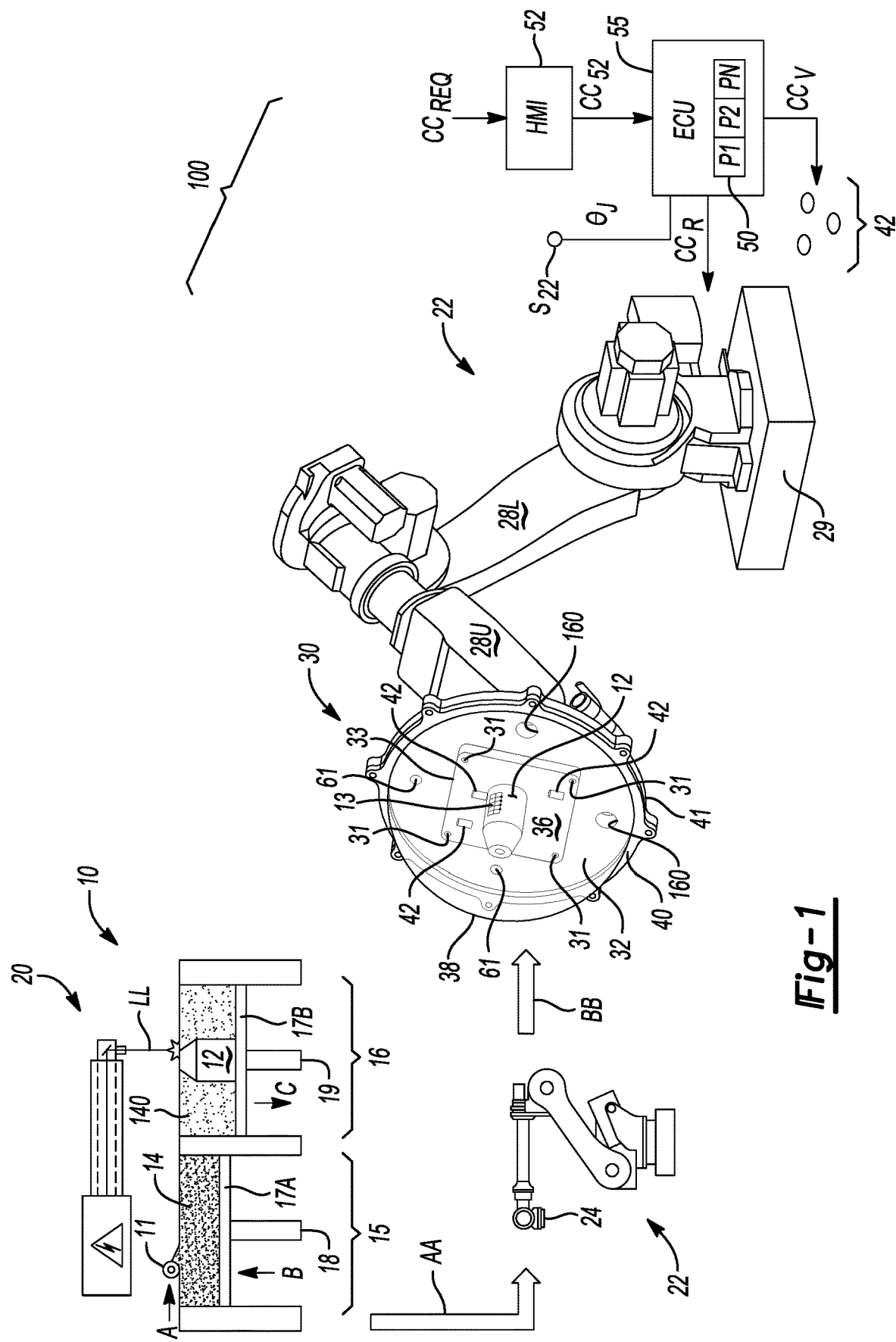
FIG. 1 is a schematic flow diagram of an exemplary additive manufacturing (AM) process that utilizes a system constructed and controlled as described herein in order to apply targeted vibration energy to a sacrificial support structure.

The present disclosure may be extended to modifications and alternative forms, with representative embodiments shown by way of example in the drawings and described in detail below. Inventive aspects of the disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Additionally, the term "exemplary" as used herein means "serving as an example, instance, or illustration", and thus does not indicate or suggest relative superiority of one disclosed embodiment relative to another. Words of approximation such as "about", "substantially", "approximately", and "generally" are used herein in the sense of "at, near, or nearly at", "within ±5% of", "within acceptable manufacturing tolerances", or logical combination thereof.

Figure 2:
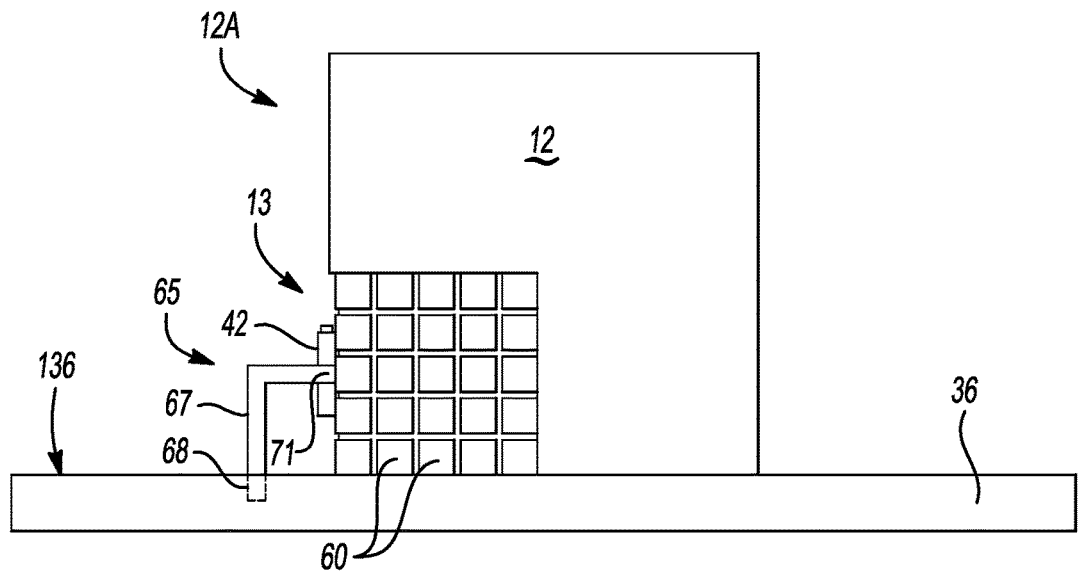
FIG. 2 is a schematic illustration of an exemplary integrally-connected 3D-printed component, support blocks, and build plate constructed using the AM process depicted in FIG. 1.
Figure 2A:
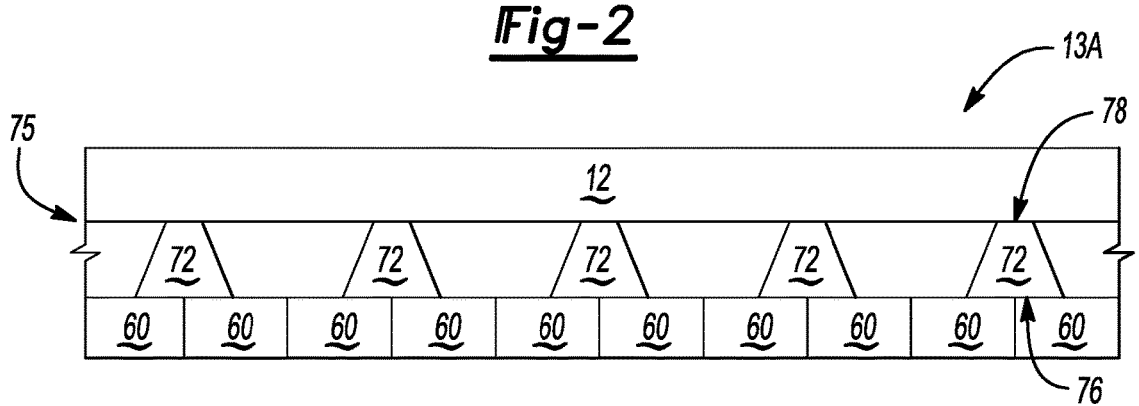
FIG. 2A is a schematic illustration of an exemplary 3D-printed component constructed using support blocks and cone supports.
Figure 3:
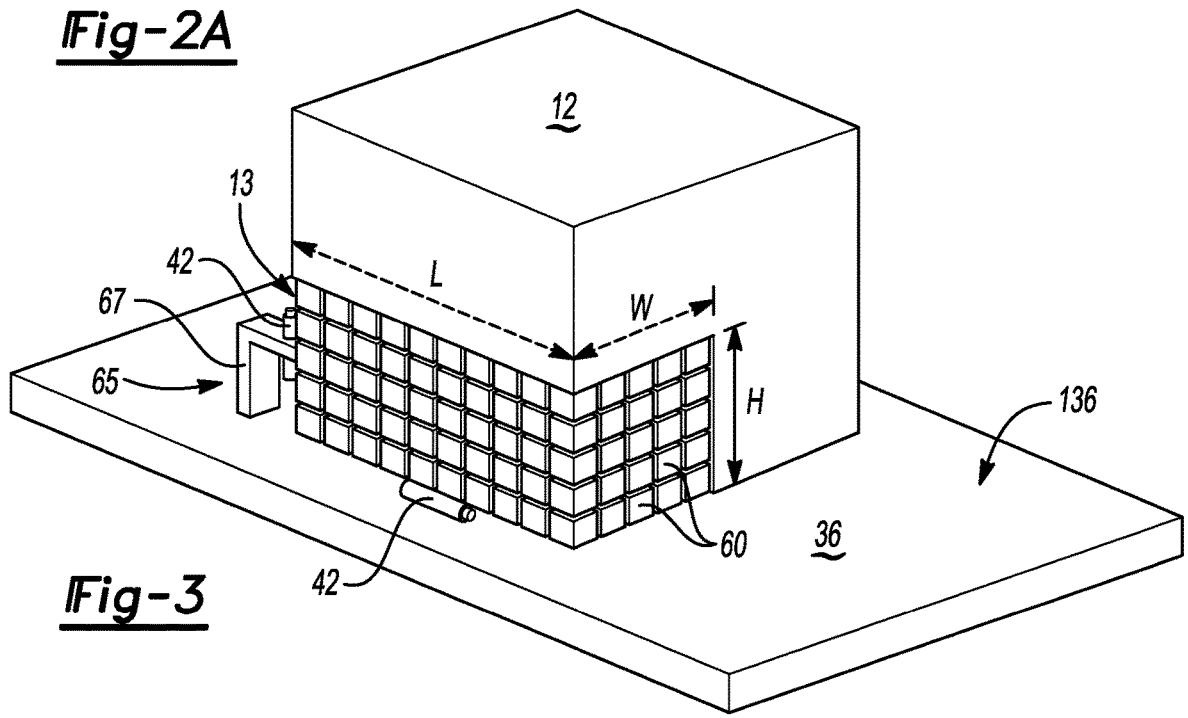
FIG. 3 is a schematic perspective view illustration of the 3D-printed component, support blocks, and build plate shown in FIG. 2.

Referring to the drawings, wherein like reference numbers refer to like features throughout the several views, FIG. 1 schematically depicts an exemplary additive manufacturing (AM) or three-dimensional (3D) printing process in which a system 100 as described herein is configured to apply targeted vibration energy to a 3D-printed support structure 13 of an exemplary 3D-printed component 12. Use of targeted vibration energy at a predetermined resonant frequency of the support structure 13 as set forth below is intended to fracture the support structure 13, and to thereby sever the support structure 13 from the component 12 during a post-processing stage of the AM process. Non-limiting embodiments of the support structure 13 are depicted in FIGS. 2, 2A, and 3, while a method 51 (FIG. 4) is usable for fracturing, separating, and removing these and other possible embodiments of the support structure 13.

As will be appreciated by those of ordinary skill in the art, sacrificial or fragmentable block supports and/or conical supports are used in AM processes to fill larger voids in or around the 3D-printed component 12, facilitate post-formation handling, and increase overall structural integrity of the component during its progressive formation. The representative support structure 13 described herein may be used, for instance, in voids adjacent to inclined surfaces of the component 12, within larger diameter bores, below overhanging or cantilevered structural members, etc. Such printed supports are intended to secure the component 12 against inadvertent detachment during the AM process, and can also promote heat transfer in or around the component 12. At the same time, the support structure 13 fills voids or spaces in and around the component 12, which in turn minimizes the amount of residual powder stock that would otherwise coat and/or remain impacted within the various crevices, channels, or cavities of the component 12. In addition to providing such in-process structural benefits, the support structure 13 described herein is a sacrificial element, i.e., a mechanically reactive or frangible structural element that is intended to be removed and disposed of or recycled after stress treatment as part of the AM process.

Certain metal-based or polymer-based AM processes entail the use of a powder bed fusion process 10 and a concentrated heat source 20, such as but not limited to an electron beam or laser beam LL as shown, in order to progressively melt powder stock 14 and thereby build the 3D-printed component 12 in a layer-by-layer manner. The powder bed fusion process 10 may position a volume of the powder stock 14 on a moveable supply platform 17A within a powder feed chamber 15, with a leveling roller 11 translating across the powder feed chamber 15 in the direction of arrow A in some embodiments. This enables the leveling roller 11 to move a thin layer of the powder stock 14 toward an adjacent build chamber 16 as the supply platform 17A rises in the direction of arrow B, e.g., using hydraulic or pneumatic force from a build piston 18.

Once the leveling roller 11 deposits some of the powder stock 14 onto a moveable build platform 17B or a previously formed layer of the 3D-printed component 12, the heat source 20 directs the beam LL onto the deposited powder stock 14 in a predetermined pattern to thereby melt the powder stock 14 and construct a given layer of the component 12. Once the layer has been constructed in this manner, the build platform 17B is lowered the direction of arrow C, using a piston 19 analogous to piston 18 but actuating in the opposing direction, to enable another layer of the component 12 to be formed. The process repeats until the component 12 has been fully printed. Use of the exemplary powder bed fusion process 10 in this manner results in the constructed 3D-printed component 12 being buried in or coated by residual powder 140, i.e., an unused quantity of the powder stock 14. A typical AM process will seek to remove most of the residual powder 140 from the build chamber 16, e.g., for instance using vacuum suction, compressed air, or pressure washing techniques, with such actions possibly assisted by manual brushing.

Figure 4:
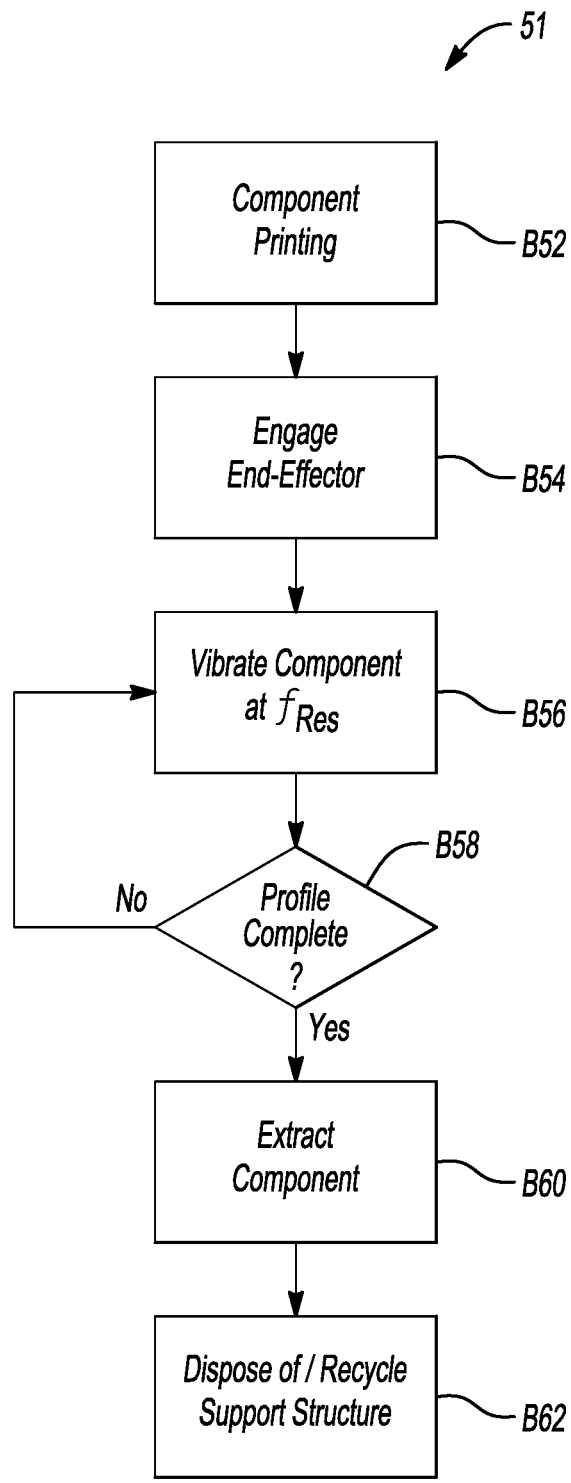
FIG. 4 is a flow chart describing an exemplary embodiment for implementing the present strategy.

After removing the residual powder 140 from the 3D-printed component 12, post-processing of the component 12 continues with heat treating or thermal stress relief. After heat treating, the component 12 is carefully separated from the above-noted support structure 13 and a build plate 36, the latter of which is integrally formed with the component 12. Such processes are typically performed using electronic discharge machining (EDM), band sawing, or CNC milling. However, certain materials of construction such as application-suitable superalloys such as INCONEL or HASTELLOY, titanium, stainless steel, other hardened grades of steel, or certain types of polymers may be difficult and time consuming to remove using manual techniques. The present solution exemplified by the method 51 of FIG. 4 is therefore intended to facilitate separation and removal of the support structure 13 using a highly automated vibration-based process as set forth herein.

To this end, the system 100 depicted schematically in FIG. 1 may optionally include an end-effector 30 that works in conjunction with a multi-axis serial robot 22 to help separate the support structure 13 from the build plate 36 and the 3D-printed component 12, and to facilitate collection and recycling or disposal of the fragmented remnants or detritus of the support structure 13. As indicated by arrows AA and BB, the component 12 may be engaged and supported by the serial robot 22 at a distal end thereof, i.e., a mounting/end plate 24, with motion of the serial robot 22 possibly controlled as part of the present strategy. Ideally, 100% vibration insulation is provided between the end plate 24 and the end-effector 30, for instance by using a carbon fiber block or other suitable materials to dampen mechanical vibration imparted to the component 12 as part of the present strategy.

As will be appreciated by one of ordinary skill in the art, an industrial robot such as the illustrated serial robot 22 typically has a base 29 and respective upper and lower control arms 28U and 28L connected by a set of revolute joints, with the serial robot 22 providing at least six control axes that collectively provide six control degrees of freedom. Once the end-effector 30 has been attached to the serial robot 22, removal of the support structure 13 from the 3D-printed component 12 formed therewith during the AM process may commence via optional additional programmed control functionality of the present system 100.

Still referring to FIG. 1 and as noted generally above, the 3D-printed component 12 is integrally constructed with and connected to the build plate 36. The progressive or accumulative nature of 3D metal or polymer printing ensures that the component 12 is essentially welded to interfacing surfaces of build plate 36, thereby necessitating the use of post-processing separation techniques to cleanly separate and detach the component 12. In the illustrated embodiment of FIG. 1, the end-effector 30 includes a planar base 32 surrounding and thus defining a window or through-opening 33. The base 32 may be embodied as a floor constructed of an application-suitable material such as plastic, steel, or aluminum. The through-opening 33 of the base 32 is configured, i.e., sized and shaped, to receive the build plate 36 therein. For example, the build plate 36 may be rectangular or square in a plan view, with other sizes and/or shapes being possible within the scope of the disclosure. Thereafter, the build plate 36 is secured to the base 32, e.g., using perimeter fasteners 31 or other suitable attachment mechanisms.

The end-effector 30 may be optionally attached to a single open-ended enclosure 38. In such an embodiment, a perimeter clamp 40 may attach and seal to a mating perimeter flange 41 of the base 32, such that the enclosure 38, the base 32, and the build plate 36 collectively encapsulate the 3D-printed component 12 and form a containment cavity 39 suitable for collecting the fragments of the support structure 13 at the end of the present method 51. The enclosure 38 in the depicted non-limiting embodiment of FIG. 1 is a solid hemispherical bubble or dome, and thus has a circular perimeter. In such an embodiment, the above-noted perimeter clamp 40 is an annular or ring-shaped clamping ring as depicted. To facilitate visibility of the component 12 when encapsulated within the cavity 39, the hemispherical dome or other configuration of the enclosure 38 may be constructed of a transparent material such as impact-resistant glass or an impact-resistant plastic material such as acrylic, polycarbonate, polyethylene (PE), polylactic acid (PLA), polyethylene terephthalate (PET), etc.

The base 32 in the illustrated embodiment of FIG. 1 may also include service ports 61 and 160, e.g., circular holes or fluid passages extending entirely through the base 32. The service ports 61 may be configured to operate as vacuum ports, and thus may be configured to connect to a vacuum device (not shown), e.g., a vacuum pump. Similarly, the service ports 160 may include one or more gas ports each configured to connect to a pressurized inert gas supply (not shown), e.g., a pressurized cannister of an application-suitable inert gas such as argon or nitrogen. The present process may include vacating the cavity 39 using a controlled vacuum once the 3D-printed component 12 has been encapsulated within the cavity 39. At the same time, the process may include pumping argon, nitrogen, or another application-suitable inert gas into the cavity 39 through the ports 61. Once the atmosphere within the cavity 39 is sufficiently pressurized with inert gas, the ECU 50 may commence energizing of the transducers 42 in accordance with the present method 51.

The system 100 shown in FIG. 1 includes one or more transducers 42. By way of example and not limitation, the transducers 42 may be embodied as magnetostrictive devices, piezoelectric crystals, or other suitable transducer hardware outputting a predetermined resonant frequency as a single discrete frequency, a randomized frequency, or a swept range of calibrated frequencies in different embodiments. Each transducer 42 is connected to the support structure 13 and possibly to the base 32 and/or to the 3D-printed component 12. The transducers 42 are configured to convert input energy from vibration control signals (arrow $CC_V$) to vibration energy at a predetermined resonant frequency of the support structure 13. That is, the support structure 13 is designed with a particular resonant frequency and/or the resonant frequency is identified offline using suitable modal formulation software, such as but not limited to NASTRAN. The transducers 42 are then tuned to such a resonant frequency, i.e., configured to vibrate at the resonant frequency, and mechanically coupled to the support structure 13, such as using an indexing feature 65 as shown in FIGS. 2 and 3. By way of example and not limitation, this may entail clamping the transducer 42 at a distal end of the indexing feature 65. The particular resonant frequency or resonant frequency range used in a given embodiment would be dependent upon the properties of the materials used to construct the component 12, i.e., the raw powder stock 14, as well as the geometry and configuration of the component 12.

In operation, an electronic control unit (ECU) 55 is configured to transmit the vibration control signals (arrow $CC_V$) to each of the transducers 42, the receipt of which causes the transducers 42 to vibrate at the resonant frequency of the support structure 13, with the transducers 42 doing so for a calibrated duration. Such a duration may vary with the application, and is defined herein as being a predetermined duration sufficient for fracturing the support structure 13, e.g., 4-5 minutes. The resonant frequency of the support structure 13 should be sufficiently different from the resonant frequency of the 3D-printed component 12 to ensure that the support structure 13 resonates without resonating the component 12.

The ECU 55 of FIG. 1 may also receive measured joint angles (arrow $\theta_J$) from joint angle sensors $S_{22}$ of the serial robot 22, one of which is shown for illustrative simplicity to represent the collective set. In some embodiments, the ECU 55 may respond to the measured joint angles (arrow $\theta_1$) by transmitting robot control signals (arrow $CC_R$) to individual joint actuators of the serial robot 22. Such an approach would allow the ECU 55 to optimize removal of fractured remnants or detritus of the support structure 13 by coordinating control of gross motion (macro-movements) of the serial robot 22 with control of the fine vibrational motion (micro-movements) imparted to the support structure 13 by the various transducers 42. Optionally and without limitation, some transducers 42 may be configured to vibrate at other frequencies, e.g., ultrasonic frequencies, to facilitate the removal of residual powder 140 that may remain impacted within the component 12.

While depicted as a unitary control module in FIG. 1 for illustrative simplicity, the ECU 55 may be physically embodied as one or more electronic control units or processing nodes each having application-sufficient memory and associated hardware and software, such as but not limited to a high-speed clock, timer, input/output circuitry, buffer circuitry, and the like. Memory may include sufficient amounts of read only memory, for instance magnetic or optical memory. Instructions embodying a control method may be programmed as computer-readable instructions and executed during operation of the system 100. The ECU 55 may encompass one or more control modules, logic circuits, application-specific integrated circuits (ASICs), central processing units (CPUs), microprocessors, and/or other requisite hardware as needed to provide the programmed functionality described herein.

The ECU 55 may be optionally programmed with multiple vibration control profiles 50, which are labeled P1, P2, . . . , PN for added clarity. Each individual vibration control profile 50 may correspond to a different predetermined configuration of the support structure 13, with electronic signals ($CC_{52}$) to the ECU 50 or generated thereby possibly identifying an actual configuration of the 3D-printed component 12. In such an embodiment, the ECU 55 may selectively activate the transducers 42 according to the particular vibration control profile 50 that corresponds to the identified actual configuration of the support structure 13.

A human-machine interface (HMI) device 52 may be used according to some implementations of the system 100. For example, the HMI device 52 may be a touch screen device, a keyboard, or a keypad of the types typically used as part of a programmable logic controller or PLC architecture in a plant environment. The HMI device 52 may be configured to identify the actual configuration via the electronic signals (arrow $CC_{52}$) to the ECU 55, doing so in response to an input request ($CC_{REQ}$), e.g., from an operator of the system 100, or the HMI device 52 may receive such a request automatically or autonomously, e.g., via communication with an external process controller (not shown).

FIGS. 2 and 3 depict a simplified schematic representation of the 3D-printed component 12 in which the component 12 is integrally formed with the build plate 36 along a first primary surface 136 thereof, such that the component 12 is attached to the build plate 36 on or along the first primary surface 136. The illustrated embodiment of the component 12 includes an exemplary cantilevered portion 12A. To facilitate 3D-printing of the component 12 with such an overhanging feature, the cantilevered portion 12A is supported from underneath by the support structure 13, which in turn is printed in place on the build plate 36 in conjunction with printing of the component 12. The resulting support structure in the illustrated embodiment is a plurality of frangible support blocks 60 collectively having a length L, width W, and height H as best shown in FIG. 3, with the term "frangible" as used herein meaning structure that is readily breakable or fracturable, i.e., relatively brittle or weak relative to construction of the component 12.

The transducers 42 described above, which are specially tuned to the predetermined resonant frequency of the support structure 13, are thereafter connected to the support structure 13 and placed in contact therewith. Such connections ensure that, when the transducers 42 are eventually activated, the resulting vibration energy is transmitted directly into the support structure 13. In response, the support structure 13 resonates for a calibrated duration sufficient for fracturing and separating the support blocks 60 from each other, from interfacing surfaces of the component 12, and from the build plate 36.

To facilitate connection of the transducers 42 to the support structure 13, one or more of the transducers 42 may be attached to the above-mentioned indexing feature 65 in direct contact with the support structure 13. For example, the indexing feature 65 may be embodied as a lightweight tool tab, e.g., an L-shaped holder or bracket having one or more legs 67 as shown, and possibly a clamp 71 disposed at a distal end and configured to grasp, cradle, or securely support the transducer 42 therein or thereon. Positioning the indexing feature 65 with respect to the support structure 13 may therefore include inserting a leg 67 of the indexing feature 65 into a corresponding mating hole 68 in the build plate 36 (see FIG. 2). The size, shape, and orientation of such an indexing feature 65 may be customized to the configuration of the component 12 and the support structure 13, and therefore the simplified embodiment of the indexing feature 65 shown in FIGS. 2 and 3 is intended to be non-limiting and illustrative of the present teachings.

Referring briefly to FIG. 2A, in some embodiments the support structure 13 of FIGS. 2 and 3, shown as support structure 13A, may include a plurality of cone supports 72 spaced apart from each other and each having a base end 76 tapering toward a narrower distal end 78. The base end 76 of the cone supports 72 is integrally formed with a row of the above described support blocks 60, with a distal end 78 of the cone supports 72 integrally formed with the 3D-printed component 12 along a support-component interface 75. Use of the illustrated embodiment of FIG. 2A effectively reduces the surface area across which the support structure 13 is connected to the component 12 at or along the various support-component interfaces 75, which in turn facilitates vibration-induced disruptive bonding, fracturing, and sheering of the support structure 13 away from the component 12 and build plate 36.

Referring to FIG. 4, one of ordinary skill in the art will appreciate that various methodologies or strategies may be implemented to separate the support structure 13 described above. For instance, such a method may proceed by engaging a transducer 42, i.e., one or more, with a corresponding one of the indexing features 65, and positioning the indexing feature 65 with respect to the support structure 13 such that the transducer(s) 42 contact the support structure 13 as shown in FIGS. 2 and 3. Once this arrangement has been established, the method may include selectively activating the transducer(s) 42 during a post-processing stage of the AM process, via the ECU 55, to thereby cause the transducer (s) 42 to vibrate at the predetermined resonant frequency of the support structure 13 until the support structure 13 ultimately fractures or breaks. Thereafter, the broken support structure 13, i.e., the detritus or fragments thereof, are separated from the 3D-printed component 12.

An example embodiment of the present method 51 for the removing the support structure 13 from an additive part such as the 3D-printed component 12 of FIGS. 1-3 commences at block B52 with 3D printing of the component 12 (Component Printing). Block B52 may entail uploading a 3D model of the finished component 12 into additive manufacturing/ 3D printing hardware and progressively constructing the component 12 in a layer-by-layer manner, e.g., using the laser or electron beam LL of the representative powder bed fusion system 10 shown schematically in FIG. 1. The process continues to block B54 when the component 12 has been printed.

At block B54, the 3D-printed component 12 and the build plate 36 integrally formed therewith are engaged with the base plate 32 of the present end-effector 30 (Engage End-Effector). That is, the build plate 36 is inserted through the mating through-opening 33 in the base plate 32 and secured in place, such as via the perimeter fasteners 31. Block B54 may include receiving the build plate 36 via an end-effector 30 of the serial robot 22 of FIG. 1, and may also entail connecting the enclosure 38, e.g., a hemispherical enclosure, dome, or bubble, to the end-effector 30 to thereby encapsulate the 3D-printed component 12, the build plate 36, and the support structure 13 within the containment cavity 39.

Once the build plate 36 has been securely locked to the base plate 32 in this manner, the optional enclosure 38 of FIG. 1 may be secured to the base plate 32, e.g., by bolting the perimeter clamping ring 40 to the perimeter flange 41. The enclosure 38 would have a larger footprint than the build plate 36, and thus would extend slightly beyond the base plate 32 of the end-effector 30, such that the atmosphere surrounding the now-encapsulated component 12 within the containment cavity 39 may be evacuated through the service ports 61 of FIG. 1 while an inert gas is piped into the containment cavity 39 through the service ports 160 to pressurize the enclosure 38. The method 51 then continues to block B56.

Block B56 includes vibrating the 3D-printed component 12, possibly within the optional containment cavity 39 shown in FIG. 1, via operation of the transducers 42. As noted above, such vibration occurs at a predetermined resonant frequency (Vibrate Component at $f_{res}$) such as by executing a predetermined vibration profile 50 of FIG. 1 tailored to effective fracturing and separation of the support structure 13. As part of block B56, the ECU 55 of FIG. 1 may command the serial robot 22 to move in a particular manner in order to assist the effects of vibration of the transducers 42, such as by rotating or inverting the end-effector 30 to allow gravity to help deposit or collect the detritus or fragments of the support structure 13 in the enclosure 38. The method 51 then proceeds to block B58.

Block B58 includes determining, via the ECU 55 shown in FIG. 1, whether the vibration profile 50 selected and initiated at block B56 is complete. By way of example, a timer may be started at the onset of block B58 to commence transmission of vibration energy into the support structure 13 for a calibrated duration sufficient for sheering the support structure 13 away from the component 12 and the build plate 36. Such a duration may be identified beforehand and stored in memory of the ECU 55. Blocks B56 and B58 continue in a loop until the calibrated duration has elapsed (Profile Complete?), at which point the process continues to block B60. Blocks B56 and B58 thus execute in a loop until the calibrated duration has elapsed.

Block B60 of FIG. 3 includes extracting the 3D-printed component 12 from the enclosure 38 (Extract Component). When the enclosure 38 is not used, block B60 may simply include detaching and removing the component 12 and build plate 36 from the base 32. Embodiments of block B60 may include removing the perimeter fasteners 43 or other restraining mechanisms to thereby detach the perimeter clamping ring 40 from the perimeter flange 41 surround the base 32. The component 12 may thereafter be separated from the build plate 36 using any suitable separation techniques and thereafter cleaned, polished, burnished, or painted as needed. The method 51 proceeds to block B62.

At block B62, the resulting fragments, powder remnants, or other detritus from the now-sacrificed support structure 13 may be collected within the containment cavity 39 and disposed of (Dispose of Support Structure). For example, such fragments may be vacuumed out of the optional enclosure 38 and directed into an external container (not shown) for recycling or disposal. The enclosure 38 in some embodiments may be cleaned, e.g., using pressurized air or water, and then reused. Alternatively, the enclosure 38 itself and all of its contents may be recycled or disposed such that block B62 entails depositing the enclosure 38 alone or with its contents into a disposal bin. Depending on the composition of the support structure 13, disposal in this manner may require specialized handling and disposal bins, and therefore the particular manner in which handling and disposal are conducted within the scope of block B62 may vary with the application.

The system 100 of FIG. 1 used in accordance with the exemplary method 51 of FIG. 4 may provide a viable solution to the prevailing problem of separating the 3D-printed component 12 from the support structure 13. The disclosed strategy may optionally encapsulate the component 12 beneath a dome-shaped or other suitably shaped enclosure, e.g., the example enclosure 38 of FIG. 1, which would enable the component 12 and support structure 13 to be hermetically sealed within the containment cavity 39. Thereafter, targeted applications of vibration energy into the support structure 13 at the prevailing resonant frequency of the support structure 13 has the effect of breaking away or sheering the support structure 13 from the component 12 and the build plate 36, with collection of the resulting fragments of the support structure 13 within the enclosure 38 possibly being assisted by gravity and motion control over the serial robot 22 as shown in FIG. 1. These and other benefits will be readily appreciated by one of ordinary skill in the art in view of the foregoing disclosure.

Aspects of the present disclosure have been described in detail with reference to the illustrated embodiments. Those skilled in the art will recognize, however, that certain modifications may be made to the disclosed structure and/or methods without departing from the scope of the present disclosure. The disclosure is also not limited to the precise construction and compositions disclosed herein. Modifications apparent from the foregoing descriptions are within the scope of the disclosure as defined by the appended claims. Moreover, the present concepts expressly include combinations and sub-combinations of the preceding elements and features.

What is claimed is:

1. A system for separating a support structure having a predetermined resonant frequency from a three-dimensional (3D)-printed component that is integrally printed with the support structure during an additive manufacturing (AM) process, the system comprising:
    at least one transducer;
    a clear hemispherical enclosure configured to encapsulate the 3D-printed component and the support structure;
    at least one indexing feature configured to engage the at least one transducer and position the at least one transducer in contact with the support structure; and
    an electronic control unit (ECU) in communication with the at least one transducer, wherein the ECU is configured to selectively activate the at least one transducer during a post-processing stage of the AM process to thereby cause the at least one transducer to vibrate at the predetermined resonant frequency of the support structure for a duration sufficient for fracturing the support structure and thereby separating the support structure from the 3D-printed component.

2. The system of claim 1, wherein the at least one transducer includes a plurality of transducers, and wherein the at least one indexing feature includes a plurality of indexing features each configured to connect to a respective one of the plurality of transducers.

3. The system of claim 2, wherein the support structure is constructed of a plurality of frangible support blocks, and each respective indexing feature of the plurality of indexing features is configured to connect a respective transducer of the plurality of transducers to a different portion of the support structure.

4. The system of claim 3, wherein the support structure is constructed of a plurality of frangible support cones each having a narrow end connected to the 3D-printed component and a base end connected to at least some of the frangible support blocks.

5. The system of claim 1, wherein the at least one transducer includes a plurality of piezoelectric devices connected to different areas or surfaces of the support structure.

6. The system of claim 1, wherein the 3D-printed component and the support structure are integrally printed with a build plate during the AM process, and wherein the at least one indexing feature is configured to engage a corresponding mating hole in the build plate.

7. The system of claim 6, further comprising:
    an end-effector that includes a base having a through-opening, wherein the through-opening is configured to receive the build plate; and
    an enclosure having a perimeter flange configured to attach to the base such that the enclosure, the base, and the build plate collectively encapsulate the 3D-printed component and the support structure while the ECU activates the at least one transducer, wherein the clear hemispherical enclosure includes a perimeter flange configured to attach to the base of the end-effector, such that the clear hemispherical enclosure, the base, and the build plate collectively encapsulate the 3D-printed component and the support structure while the ECU activates the plurality of transducers.

8. The system of claim 7, further comprising: a multi-axis serial robot configured to connect to the end-effector such that the end-effector forms a distal end link of the multi-axis serial robot, wherein the ECU is configured to control motion of the multi-axis serial robot concurrently with selectively activating the at least one transducer.

9. The system of claim 1, wherein the ECU is programmed with multiple vibration control profiles each corresponding to a different predetermined configuration of the 3D-printed component and the support structure, and wherein the ECU is configured to identify an actual configuration of the 3D-printed component and the support structure, and to selectively activate the at least one transducer using one of the vibration control profiles that corresponds to the actual configuration of the 3D-printed component and the support structure.

10. The system of claim 9, further comprising: a human-machine interface (HMI) device configured to transmit an input signal to the ECU in response to an input request from an operator of the system to thereby identify the actual configuration of the 3D-printed component and the support structure.

11. A method for separating a support structure having a predetermined resonant frequency from a three-dimensional (3D)-printed component that is integrally printed with the support structure during an additive manufacturing (AM) process, the method comprising:

engaging at least one transducer with at least one indexing feature;

positioning the at least one indexing feature with respect to the support structure such that the at least one transducer is in contact with the support structure;

encapsulating the 3D-printed component and the support structure in a clear hemispherical enclosure;

selectively activating the at least one transducer during a post-processing stage of the AM process, via an electronic control unit (ECU) while the 3D-printed component and the support structure are encapsulated in the clear hemispherical enclosure, to thereby cause the at least one transducer to vibrate at the predetermined resonant frequency until the support structure fractures or breaks; and separating the support structure from the 3D-printed component after the support structure fractures or breaks.

12. The method of claim 11, wherein engaging the at least one transducer with the at least one indexing feature includes clamping the at least one transducer at a distal end of the at least one indexing feature.

13. The system of claim 12, wherein the support structure is constructed of frangible support blocks, and positioning the at least one indexing feature with respect to the support structure includes positioning the at least one indexing feature adjacent to a row of the frangible support blocks along an interfacing surface with the 3D-printed component.

14. The system of claim 12, wherein the support structure is constructed of a plurality of frangible support cones each having a narrow end connected to the 3D-printed component and a base end connected to at least some of the frangible support blocks.

15. The method of claim 11, wherein the 3D-printed component and the support structure are integrally printed with a build plate during the AM process, and wherein positioning the at least one indexing feature with respect to the support structure includes inserting a leg of the at least one indexing feature into a corresponding mating hole in the build plate.

16. The method of claim 15, further comprising:
receiving the build plate via an end-effector of a serial robot; and
connecting a hemispherical enclosure to the end-effector to thereby encapsulate the 3D-printed component, the build plate, and the support structure within a cavity, wherein separating the support structure from the 3D-printed component after the support structure fractures or breaks includes collecting detritus or fragments of the support structure within the cavity.

17. The method of claim 11, wherein the ECU is programmed with multiple vibration control profiles each corresponding to a different predetermined configuration of the 3D-printed component and the support structure, the method further comprising:

identifying an actual configuration of the 3D-printed component and the support structure via the ECU; and selectively activating the at least one transducer using one of the vibration control profiles that corresponds to the actual configuration of the 3D-printed component and the support structure.

18. A system for separating a support structure having a predetermined resonant frequency from a three-dimensional (3D)-printed component that is integrally printed with the support structure and a build plate during an additive manufacturing (AM) process, the system comprising:

a multi-axis serial robot;

an end-effector that includes a base having a through-opening, wherein the through-opening is configured to receive the build plate;

a plurality of transducers;

a plurality of indexing features each configured to engage a corresponding one of the plurality of transducers, to engage the build plate, and to position the corresponding one of the plurality of transducers in contact with the support structure;

a clear hemispherical enclosure having a perimeter flange configured to attach to the base of the end-effector, such that the clear hemispherical enclosure, the base, and the build plate collectively encapsulate the 3D-printed component and the support structure while the ECU activates the plurality of transducers; and an electronic control unit (ECU) in communication with the plurality of transducers, wherein the ECU is configured to selectively activate the plurality of transducers during a post-processing stage of the AM process to thereby cause the plurality of transducers to vibrate at the predetermined resonant frequency of the support structure until the support structure fractures or breaks, thereby separating the support structure from the 3D-printed component.

19. The system of claim 18, wherein the ECU is programmed with multiple vibration control profiles each corresponding to a different predetermined configuration of the 3D-printed component and the support structure, and wherein the ECU is configured to identify an actual configuration of the 3D-printed component and the support structure, and to selectively activate the plurality of transducers using one of the vibration control profiles that corresponds to the actual configuration of the 3D-printed component and the support structure.

20. The system of claim 18, wherein the plurality of transducers includes a plurality of piezoelectric devices connected to different areas or surfaces of the support structure.

* * * * *